(12) United States Patent
Frei et al.

(10) Patent No.: US 9,023,907 B2
(45) Date of Patent: May 5, 2015

(54) FLEXIBLE POLYURETHANE FOAM

(75) Inventors: Hans Frei, Jona (CH); Henri Mispreuve, Wangen (CH); Reinold Naescher, Zurich (CH); Kurt Schoenenberger, Siebnen (CH); Stefano Tenzi, Wetzikon (CH)

(73) Assignee: Fritz Nauer AG, Wolfhausen (CH)

( * ) Notice: Subject to any disclaimer, the term of this patent is extended or adjusted under 35 U.S.C. 154(b) by 1043 days.

(21) Appl. No.: 11/579,119

(22) PCT Filed: May 12, 2005

(86) PCT No.: PCT/EP2005/005314
§ 371 (c)(1),
(2), (4) Date: Dec. 28, 2006

(87) PCT Pub. No.: WO2005/108455
PCT Pub. Date: Nov. 17, 2005

(65) Prior Publication Data
US 2007/0232711 A1    Oct. 4, 2007

(30) Foreign Application Priority Data

May 12, 2004 (CH) .......................... 841/04
Apr. 22, 2005 (GB) .................................. 0508091.6

(51) Int. Cl.
| | | |
|---|---|---|
| *C08G 18/28* | (2006.01) | |
| *C08G 18/50* | (2006.01) | |
| *C08G 18/76* | (2006.01) | |
| *C08G 18/10* | (2006.01) | |
| *C08G 101/00* | (2006.01) | |

(52) U.S. Cl.
CPC ........ *C08G 18/5045* (2013.01); *C08G 18/7621* (2013.01); *C08G 18/10* (2013.01); *C08G 2101/0008* (2013.01); *C08G 2101/005* (2013.01); *C08G 2101/0083* (2013.01); *C08J 2205/06* (2013.01)

(58) Field of Classification Search
CPC ............... C08G 18/10; C08G 18/5045; C08G 18/7621; C08G 2101/0008; C08G 2101/005; C08G 2101/0083; C08J 2205/06
USPC .................................. 521/130, 159, 170, 174
See application file for complete search history.

(56) References Cited

U.S. PATENT DOCUMENTS

| | | | | |
|---|---|---|---|---|
| 4,147,678 | A | * | 4/1979 | Mao et al. ...................... 524/100 |
| 4,576,855 | A | * | 3/1986 | Okina et al. ................... 428/215 |
| 4,839,397 | A | * | 6/1989 | Lohmar et al. ................ 521/159 |
| 4,904,706 | A | | 2/1990 | Uenishi et al. |
| 5,063,253 | A | | 11/1991 | Gansen et al. |
| 5,585,413 | A | * | 12/1996 | Nagashima ................... 521/159 |
| 6,242,555 | B1 | | 6/2001 | Du Prez et al. |
| 2004/0102535 | A1 | * | 5/2004 | Casati et al. ................... 521/155 |
| 2004/0122118 | A1 | * | 6/2004 | Tanaka ............................ 521/50 |
| 2005/0014858 | A1 | * | 1/2005 | Choi et al. ..................... 521/155 |

OTHER PUBLICATIONS

Comparative results from EPO proceeding.

* cited by examiner

*Primary Examiner* — John Cooney
(74) *Attorney, Agent, or Firm* — Notaro, Michalos & Zaccaria P.C.

(57) ABSTRACT

Flexible polyurethane foam is made by mixing prepolymer with foam-forming ingredients comprising isocyanate and water which react to give carbon dioxide. The prepolymer is hydroxyl-tipped, being made by reacting polyol with less than the theoretical proportion of isocyanate required to react with available hydroxyl groups of the polyol. The prepolymer is a new storage stable starting material for use in making flexible polyurethane foam, and the foam produced with the prepolymer has advantageous properties with regard to hydrolysis resistance. The prepolymer may be made with low or high viscosity by appropriate selection of the proportion of isocyanate which reacts with the polyol. At high viscosities cell structure can be advantageously controlled by appropriate gasification or degasification during foaming.

4 Claims, No Drawings

FLEXIBLE POLYURETHANE FOAM

This invention relates to flexible polyurethane (PU) foam.

Methods for the manufacture of flexible polyurethane foams (flexible PU foams) are known in the art and are covered, for example, on pages 170-235 of the Plastics Manual, Volume 7, Polyurethanes, Becker/Braun, 2nd edition, published by Carl Hanser Verlag.

Conventionally, flexible PU foam may be made by reacting a polyol with a multifunctional isocyanate so that NCO and OH groups form urethane linkages by an addition reaction, and the polyurethane is foamed with carbon dioxide produced in situ by reaction of isocyanate with water.

This conventional process may be carried out as a so-called 'one-shot' process whereby the polyol, isocyanate and water are mixed together so that the polyurethane is formed and foamed in the same step.

It is however also known to use a two step process whereby in a first step polyol is reacted with isocyanate to give a so-called 'prepolymer' and this is foamed, by reaction of isocyanate and water to produce carbon dioxide, in a second step.

GB 870119 and GB 929371 both describe reaction of a polyol with toluene diisocyanate (TDI) to give a viscous prepolymer which is subsequently mixed with water and catalysts to produce foam.

However, these prior publications describe prepolymers which are made with sufficient TDI to react with all of the available polyol OH groups whereby the resulting prepolymer is NCO terminated; it is a so-called "isocyanate prepolymer" which does not have available OH groups. The NCO groups of the prepolymer are available for reaction with water whereby PU foam can be produced without requiring addition of further isocyanate.

So called "polyol prepolymers" are also known in the manufacture of PU materials. As described on page 76 of "Polyurethane Handbook" edited by Dr. Günter Oertel, Hanser Publishers, a polyol prepolymer is an oligomeric adduct obtained through conversion of polyether and polyester polyols by reaction with a stoichiometric deficiency of isocyanate so as to leave residual hydroxyl groups. As described these prepolymers are urethane-modified polyols which have higher viscosities than unmodified polyols and are used in the field of lacquers, paints, coatings and sealants. For example, thermally activated hard coatings (baked coatings) can be made from polyol prepolymer with masked or blocked polyisocyanates. This field of application is different from the field of flexible PU foam with which the present invention is concerned.

In the field of flexible PU foam it is known that hydrolysis causes the foam to age and in particular to soften. In various applications this is undesirable because it alters the characteristics of the material in use.

An object of the present invention is to provide a flexible PU foam which has a substantially improved resistance to hydrolysis.

Thus, and in accordance with the present invention, there is provided a method of making a PU foam from a mixture of prepolymer and foam-forming ingredients, wherein the prepolymer is made by reacting at least one polyol with at least one multifunctional isocyanate characterised in that the prepolymer is a non-foamed polyol prepolymer having available OH groups, and the foam-forming ingredients comprise at least a multifunctional isocyanate and water.

With this method it has been found possible to make PU foam which has surprising resistance to hydrolysis ageing.

As mentioned above, it is known to use polyol prepolymer to make e.g. hard baked coatings and it is surprising that it can be used to make flexible PU foam with advantageous properties.

Contrary to the teachings of the above mentioned prior publications which describe the production of foam using isocyanate tipped prepolymer, the present invention uses an isocyanate/polyol prepolymer which has available OH groups and which therefore requires addition of further isocyanate to produce PU foam, and it has been found that this can result in foams having surprising hydrolysis resistance.

Without intending to be restricted to any mechanism for this hydrolysis resistance, it is thought that use of the prepolymer results in PU foam which has urea linkages which are less freely available for attack by water.

Reaction of isocyanate with polyol gives urethane linkages by an addition reaction.

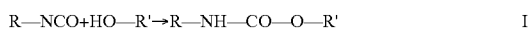

$$R-NCO + HO-R' \rightarrow R-NH-CO-O-R' \qquad \text{I}$$

Isocyanate reacts with water to give amine and carbon dioxide.

$$R-NCO + H_2O \rightarrow RNHCOOH \rightarrow RNH_2 + CO_2 \qquad \text{II}$$

Amine reacts with isocyanate to give urea linkages.

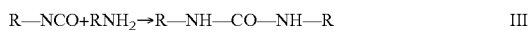

$$R-NCO + RNH_2 \rightarrow R-NH-CO-NH-R \qquad \text{III}$$

Urea linkages gradually hydrolyze to give amine and carbon dioxide.

$$R-NH-CO-NH-R + H_2O \rightarrow 2RNH_2 + CO_2 \qquad \text{IV}$$

Interaction of NCO, OH, $H_2O$ will give PU chains which incorporate urea linkages as a consequence of above reactions I, II, III occurring at the same time.

Flexible PU foam typically has a segmented structure made up of long flexible polyol chains linked by polyurethane and polyurea aromatic hard segments with hydrogen bonds between polar groups such as NH and carbonyl groups of the urea and urethane linkages.

Water can attack the structure by hydrolysing urea linkages to cause cleavage i.e. to split chains in accordance with reaction IV, and also by penetrating the structure to modify hydrogen bonding causing slippage of chains within the structure, thus causing the foam to change its physical properties and in particular to soften.

It is thought that use of a prepolymer wherein part of the isocyanate/polyol reaction has taken place prior to foaming can minimise formation of urea linkages, since a network of PU chains is formed substantially without opportunity for urea linkages to form by isocyanate/water reaction.

Also, it is thought that those urea linkages which do form during the foaming process, when isocyanate reacts both with water and with available OH groups on the prepolymer, may tend to be well incorporated with better 'organisation' within the network of PU chains so as to be less freely available for attack by water. One possible explanation is that PU groups serve as seeds for urea formation and thereby give a more organised or heterogeneous system into which water cannot so readily penetrate to hydrolyze urea linkages to cause cleavage or to modify hydrogen bonding to cause slippage, as discussed above. An increase in isocyanate in the prepolymer may increase the level of organisation but as discussed hereinafter increased isocyanate will increase viscosity of the prepolymer and can change the physical and chemical characteristics of the foam.

In the case where PU foam is produced by reacting isocyanate, polyol and water together in the so-called 'one-shot' process, or by reacting isocyanate terminated prepolymer with water, urea linkages may be incorporated in a more 'disorganised' two-phase system so as to be more susceptible to 'reorganisation' of the network of PU chains by hydrolysis or chain slippage. This 'reorganisation' results in softening or hardness loss.

With the invention the prepolymer may be a storage stable material made by reaction of the isocyanate and the polyol wholly or substantially in the absence of water. The prepolymer is pre-prepared and foamed, by exposure to the reaction of isocyanate and water producing carbon dioxide, in a subsequent stage and this stage may be performed shortly after production of the prepolymer in the same or different apparatus, or in the case of storage stable prepolymer which is made or supplied wholly separately, on a subsequent occasion using different apparatus as required.

As used herein the term prepolymer is used in the conventional sense to refer to urethane-modified polyol, i.e. polymeric material produced by reaction of polyol with isocyanate having urethane linkages for use in the production of end-product polyurethane material. Also as used herein the reference to non-foamed prepolymer means prepolymer produced substantially without any foaming. In practice, foaming may occur to a trivial or insignificant extent due to unavoidable presence of traces of water, e.g. contained in the raw material polyol, which may react with the isocyanate. However, it is preferred that no water is purposefully or intentionally added in the production of the prepolymer and reaction conditions and ingredients are selected to inhibit or minimise carbon dioxide production by isocyanate/water reaction.

It is also to be understood that the process of the invention may involve use of a single prepolymer i.e. polymeric material obtained by reacting a single polyol with a single multifunctional isocyanate, or it may involve use of multiple prepolymers made by reacting any number of polyols with any number of multifunctional isocyanates to give mixed multiple different prepolymers and/or one or more copolymers.

The prepolymer may be formed by mixing the polyol, or a mixture of polyols, with the isocyanate, or a mixture of isocyanates, and possibly in the presence of one or more other ingredients such as a catalyst. This mixing may be done in a batch process e.g. with stirring, or as a continuous process by feed through a mixing head or the like. Mixing may occur at ambient temperature and may be maintained for any suitable period of time e.g. 24 hours, although other temperatures and time periods may be used depending on the nature of the reactants and any other ingredients.

With regard to the polyol this may be of any suitable kind. Typically polyether and polyester polyols are used in the production of PU foam and in accordance with the present invention it is preferred that the polyol is wholly or at least predominantly a polyether polyol. Polyether polyols result in PU foam which can be less susceptible to hydrolysis than is the case with polyester polyols. Where a polyether polyol is used this is preferably wholly or predominantly propylene oxide (PO) derived, although ethylene oxide (EO) may also be used instead of, or additionally to PO. EO derived polyol is more vulnerable to hydrolysis than PO. However it is also possible to use polyester polyol or mixtures of polyether and polyester polyol. Suitable polyols may have an OH functionality of 2 to 6, particularly 2 to 4 and may have a molecular weight (MW) in the range say 400-10,000.

It is well known in the art to use mixed polyols to vary the reactivity of the system or impart desired properties to the resulting PU foam and, with the present invention, whilst PO derived polyether polyol is generally preferred, other polyols and mixtures of polyols may be used as required.

Examples of the polyether polyols that can be used according to the invention are described, for example, on pages 44-54 and 75-78 of the Plastics Manual, Volume 7, Polyurethanes, Becker/Braun, $2^{nd}$ edition, published by Carl Hanser Verlag.

Thus, for example, polyol may be as follows:

I. derived from PO and propyleneneglycol with viscosity (at 25° C.) of 250-350 mPa·s, OH number 56±3.
II. derived from EO and PO and trimethylolpropane with viscosity (at 25° C.) 750-900 mPa·s, OH number 35±2.
III. derived from PO and trimethylolpropane with viscosity 600-700, OH number 380±25.
IV. derived from PO and glycerine with viscosity 450-550 and OH number 56±3.

All viscosity measurements (in mPa·s) are obtained using a Brookfield Viscometer. Unless otherwise stated viscosity is measured at 25° C. The OH number (hydroxyl number) is a conventional parameter which gives the concentration of NCO-reactive OH groups per unit weight in mg KOH/g.

$$\text{Hydroxyl number(OH)} = \frac{56.1 \times \text{functionality}}{\text{MW polyol}} \times 1{,}000$$

It is also possible to use those polyether polyols which already contain built-in catalysts, as for example described in WO 03/016373A1. It is likewise also possible to use mixtures of the aforementioned polyether polyols.

A preferred polyol is a triol which is a propylene oxide adduct of glycerine and has a molecular weight of the order of 3,000. Commercial examples are Voranol® 3008 (Dow Chemical Company), or DESMOPHEN® 20WB56 (Bayer).

With regard to the multifunctional isocyanate this is preferably a diisocyanate, particularly TDI (toluene diisocyanate). However other multifunctional isocyanates, preferably having a functionality of 2 to 5 may be used alone or in any suitable combination. The same isocyanate may be used both in the production of the prepolymer and in the subsequent production of the foam, or different isocyanates may be used.

Thus the multifunctional isocyanate may be any one or more of:

TDI (all isomer blends of toluene diisocyanate), MDI (methylene diphenyl isocyanate), Which may be pure or polymeric versions (so called aromatic isocyanates).

More particularly, the multifunctional isocyanate is a polyisocyanate containing two or more isocyanate groups and standard commercial di- and/or triisocyanates are typically used. Examples of suitable ones are aliphatic, cycloaliphatic, arylaliphatic and/or aromatic isocyanates, such as the commercially available mixtures of 2,4- and 2,6-isomers of diisocyanatotoluene (=tolylenediisocyanate TDI), which are marketed under the trade names Caradate® T80 (Shell) or Voranate® T80 and T65 (Dow Chemicals). 4,4'-diisocyanatodiphenylmethane (=4,4'-methylenebis(phenylisocyanate); MDI) and mixtures of TDI and MDI can also be used. It is also possible, however to use isocyanate prepolymers based on TDI or MDI and polyols. Modified or mixed isocyanates (for example Desmodur® MT58 from Bayer) may also be used. Examples of aliphatic isocyanates are 1,6-hexamethylene diisocyanates or triisocyanates such as Desmodur® N100 or N3300 from Bayer.

The relative proportions of the polyol and isocyanate which react to form the prepolymer, and the MW (molecular weight) of the polyol, may be selected as required. The proportion of the isocyanate may be 0.1-99% of that required theoretically for reaction with all available OH groups, preferably 0.1 to 50%. Viscosity increases with proportion of isocyanate and the upper limit will depend on handling requirements. In practice the hydroxyl number of the prepolymer can be determined from the relationship $$\text{OH (Prepolymer)} = \text{OH (Polyol)} - \frac{php\,(NCO) \times 561}{EW\,(NCO)}$$

OH(Polyol) is the hydroxyl number of the starting polyol which typically may be 56. php(NCO) is the proportion of NCO as parts by weight per hundred parts of polyol, and EW(NCO) is the equivalent weight of the isocyanate which is 87 for TDI (i.e. molecular weight divided by theoretical functionality).

There may be a high proportion of isocyanate and if desired the polyol MW may be high, whereby the prepolymer may be highly viscous say 30,000 mPa·s or higher. Alternatively a smaller proportion of isocyanate may be used, and if desired the polyol MW may be lower, whereby fewer OH groups are reacted and the viscosity may be lower. Lower viscosity prepolymer is more suitable for continuous PU foam production. Thus the viscosity may be less than 20,000 mPa·s, and may be less than 7,000 say as low as 700 mPa·s and/or close to or substantially identical with the viscosity of the base polyol. The MW of the polyol may be in the range 400-10,000.

It has been found that advantageous foams in accordance with the invention, i.e. foams having good hydrolysis resistance, can be made both with low viscosity prepolymer (with only a small proportion of OH groups reacted with isocyanate) and also with higher viscosity prepolymer (with a larger proportion of OH groups reacted with isocyanate). Foams made with higher viscosity prepolymer can also have advantageous properties with regard to control of cell structure, where this is required, as discussed hereinafter.

The higher viscosity prepolymers may have viscosities over 5,000 mPa·s, preferably over 7,000 mPa·s, and the upper limit may be say 50,000 mPa·s, preferably 35,000 mPa·s. In particular, a range of 9,000 to 35,000, particularly 15,000 to 35,000 mPa·s may be advantageous.

The lower viscosity prepolymers may overlap with the higher viscosity range having viscosities below 20,000 mPa·s, particularly below 7,000 mPa·s although a preferred range would be less than 5,000 mPa·s down to a viscosity close to that of the base polyol which may be 600 or 700 mPa·s.

Viscosity is determined by the proportion of isocyanate used, relative to the theoretical amount of isocyanate by weight required to react with all available hydroxyl groups of the polyol, and also by the original viscosity of the polyol or polyols mixture used to form the prepolymer. Overall, as mentioned, the proportion may be 0.1 to 99%. The low viscosity prepolymer may correspond to 0.1% to 30% or 0.1% to 23% or 25% of the required isocyanate particularly 0.1 to 12%, e.g. 3% to 12% whereas the high viscosity prepolymer may correspond to 30% to 99%, particularly 30% to 50%.

Any suitable catalysts may be used for the isocyanate addition reaction. These may be tin compounds, such as stannous dioctoate, dibutyltin dilaurate or tertiary amines such as 1,4-diaza(2,2,2)bicyclooctane, or other substances which are used in the art, such as Zinc Octoate, etc. Where necessary, two or more different catalysts may also be used simultaneously. However, the prepolymer can also be produced without catalysts, if necessary relying on heating or other reaction initiating condition.

Any added catalyst would typically be used in small quantities, e.g. of the order of 0.004% by weight for a tin salt such as dibutyl tin dilaurate, stannous octoate or higher homologues, although as mentioned amine and other catalysts can also be used. The catalyst would typically be mixed in the polyol and then the isocyanate added slowly, the resulting mixture being then allowed to react fully before foaming. Thus the initial mixing may be carried out for say 15 mins, and the further reaction may be allowed to progress for say 24 hours.

Other ingredients may also be incorporated as auxiliary agents or additives in forming the prepolymer.

These include, in particular, auxiliary agents such as chain extending agents, cross-linking agents and chain terminators.

Low molecular weight, isocyanate-reactive, difunctional compounds, such as diethanolamine or water, for example, or higher-functional compounds, such as triethanolamine, glycerine or sugar alcohols such as sorbitol may be used as chain extending agents and/or cross-linking agents.

Isocyanate-reactive, monofunctional compounds, such as monohydric alcohols, primary and secondary amines, may be used as chain terminators.

Yet further auxiliary agents known in the art, such as flame retardants, or pigments or fillers may also be added.

The prepolymer may incorporate or, prior to foaming may be mixed with other substances. For example, unreacted polyol of the same or different kind may be added e.g. to dilute the prepolymer to give a lower viscosity or to modify reactivity of the system or the properties of the resulting foam.

The prepolymer may be foamed in conventional manner using conventional devices, for example those which are described on pages 171-178 of the Plastics Manual, Volume 7, Polyurethanes, Becker/Braun, $2^{nd}$ edition, published by Carl Hanser Verlag, and using conventional foam formulations, such as those described, for example, on pages 187-193 of the Plastics Manual, Volume 7, Polyurethanes, Becker/Braun, $2^{nd}$ edition, published by Carl Hanser Verlag.

Typically, for foam production, the prepolymer will be mixed with water and/or other blowing agent, isocyanate, one or more catalysts, and one or more other ingredients such as a foam stabiliser.

Foaming may be on a batch or continuous basis and the mixture may be gassed with nitrogen.

In more detail, the foaming ingredients may comprise one or more of:

a) Isocyanates, such as aliphatic, cycloaliphatic, arylaliphatic and/or aromatic isocyanates. Examples are commercially available compounds of 2,4- and 2,6-isomers of di-isocyanatotoluene (=tolylenediisocyanate TDI). Trade names are Caradate® T80 from Shell, Voranate® T80 and T65 from Dow Chemical. It is also possible to use 4,4'-diisocyanato-diphenylmethane (=4,4'-methylenebis(phenylisocyanate); MDI) and mixtures of MDI and TDI.

Furthermore isocyanate prepolymers based on TDI or MDI and polyols may also be used. A further possibility would be modified or mixed isocyanates (e.g. Desmodur® MT58 from Bayer). Examples of aliphatic isocyanates are 1,6-hexamethylene diisocyanates or tri-isocyanates, e.g. Desmodur® N100 or N3300 from Bayer.

The isocyanate may be the same as or different from the isocyanate used to make the prepolymer.

b) Water, preferably 0.5 to 10 parts by weight to one hundred parts of polyol or prepolymer or polyol/prepolymer mixture by weight.

c) Liquid CO2 can also be used as additional blowing agent.

d) Other additives may also optionally be used, particularly those well known in the PU foaming art, such as catalysts, in particular an amine, such as DMEA (dimethyl ethanolamine), DABCO® 33 LV (a tertiary amine from Air Products), and/or a metallo-organic compounds such as a tin catalyst e.g. KOSMOS 29 (stannous octoate) or other catalysts such as zinc octoate; foam stabilizers known in the art, for example silicone surfactant such as from the Tegostab® range from Goldschmidt or the Silbyk® range from BYK-Chemie; chain extending agents and/or cross-linking agents, such as diethanolamine, glycerine, sorbitol; as well as flame retardants; fillers. Those additives and others known in the art in relation to conventional foaming processes may be used in any combination.

e) Nitrogen for gassing and controlling the cell structure (size and size distribution).

For foaming, it is also possible, where necessary, to work under a reduced or excess pressure; processing conditions for this are disclosed, for example, in U.S. Pat. No. 5,194,453.

Very fine cells are achieved in that a finely dispersed gas is fed to the basic material intended for foaming, for example to the prepolymer or a liquid mixture of the basic components. The gas is preferably nitrogen or air may be used.

As discussed hereinafter gassing to control cell structure is particularly useful with high viscosity prepolymer, e.g. prepolymer having a viscosity greater than 5,000 mPa·s.

In addition to the prepolymer, mixtures of prepolymer with either polyether polyol and/or with polyester polyol or other polyols may also be used here. Diols to hexols with any amount of ethylene oxide may be used.

As a subsidiary feature of the invention it has been found that parameters relating to cell count and viscosity of the prepolymer may be controlled to give PU foam with advantageous properties, this being a further particular advantage of the use of the described prepolymer.

Thus, in one embodiment flexible PU foam is produced having a particularly regular cell structure or where appropriate also having an irregular cell structure, in which the cell size, may range from very fine (cell count greater than 80 ppi) to very coarse (cell count reduced to 6 ppi). The term ppi, refers to a measurement of cell (or pore) size by counting the Pores per linear Inch (per 2.54 cms) on the surface of the foam. This embodiment enables manufacture of the aforementioned flexible PU foams with a method that can be used on a large industrial scale, with a predetermined desired cell size or cell count and/or cell size distribution.

In this respect, the manufacture of flexible polyether-polyurethane foams having very fine cells (>80 ppi) has hitherto been commercially unfeasible using the raw materials commonly available on the market. It is known, on the other hand, that very fine cells can be obtained if polyester polyols are foamed to produce polyester-polyurethane foams.

In the course of the present invention, however, it has also surprisingly proved possible also to process polyether polyols (which are normally considered to be low viscosity materials) into very fine-celled PUR foams by use of the prepolymer of the present invention, preferably in the context of a highly viscous prepolymer, as described hereinafter.

Unless some other meaning is explicitly stated, the term "highly viscous" is here taken to mean a viscosity of a material or material mixture equal to or greater than 5,000 particularly greater than 7,000 mPa·s.

The resulting flexible foams are always distinguished by the following characteristics, hitherto unachievable in the prior art relating to polyether polyol-based PU foams:

controlled cell count and structure (fine/course cell count and regular/irregular structure) obtained by being able to control the viscosity of the prepolymer via control of its architecture.

excellent hydrolysis ageing characteristics; and a density of 10-100, preferably 14-70 kg/m3.

A particular advantage of the method of manufacture according to the invention is the facility for purposely predetermining both the cell size or the cell count and also the regularity or irregularity of the cell size or cell structure. This is primarily achieved by varying the gassing, by means of air or nitrogen, for example, for the purpose of foaming, where necessary in combination with a greater or lesser degassing of the basic materials or at least some of them, depending on the desired foam quality.

The term "cell structure" should here be taken to mean the structure of the foam matrix in terms of size, distribution, and the number and type of cells contained therein. A uniform or regular cell structure means, that the greater majority of the cells are of the same or approximately the same size.

It is assumed that owing to the high viscosity which may be a function of the prepolymer, dependent on its architecture, the possibilities for diffusion and in particular the rates of diffusion of the gas bubbles are considerably reduced compared to low-viscosity reaction mixtures and that the gas bubbles or water vapour bubbles can thereby coalesce to form larger structures less rapidly. In particular the ability to increase the viscosity of foaming systems based on polyether polyols, which are usually low viscosity systems, and thereby control and specify the cell size is a surprising feature of the development.

Surprisingly, it is also possible, to manufacture foams having very large cells, by purposely restricting the gassing for the foaming or, on the other hand, even undertaking a controlled degassing of the isocyanate and/or the prepolymer. In this case a greater degassing produces an increase in the cell size and a reduction of the cell count in the end product. The degassing can be performed, for example, under vacuum in a closed circuit system.

The highly viscous prepolymers may have a viscosity of >5,000 mPa·s, particularly >7,000 mPa·s, preferably of 15,000 to 35,000 mPa·s or even up to say 50,000 mPa·s.

In order to better illustrate the invention, it will be further explained below with reference to examples.

EXAMPLE 1

Production of a Prepolymer by the Batch Process 96.24% polyether polyol [DESMOPHEN 20WB56 (Bayer)], hydroxyl number: 56, viscosity: approx. 700 mPa·s at 20° C.

3.75% diisocyanatotoluene 80/20 (TDI 80/20)

0.00385% dibutyltin dilaurate (DBTL)

The polyether polyol is placed in a mixing vessel at room temperature and dibutyltin dilaurate is then added whilst stirring. The diisocyanatotoluene is slowly stirred into this mixture.

After about 24 h the resulting prepolymer has a viscosity of approx. 30,000 mPa·s at 25° C.

However, the prepolymer can also be similarly produced in a continuous process.

EXAMPLE 2

Production and Characteristics of Foams According to the Invention Compared to Conventional Products Known in the Prior Art The foams were produced in a standard commercial flexible foam slab stock plant (Messrs. Hennecke, Germany) in a one-shot process. In this example the basic materials (raw materials) were metered according to the formulation directly from storage vessels into a mixing chamber by means of pumps (e.g. piston or gear pumps), the mixing chamber being equipped with an agitator and a discharge pipe.

The metering and mixing of the raw materials was done in a manner known in the art. In this example the temperature of the raw materials was adjusted to 25±3° C.

The prepolymer or polyol output overall was 50 kg/min. For the purpose of additional nucleation (that is to say additional nucleation for the development of bubbles) nitrogen gas was metered into the mixing chamber. The foaming was performed at an agitator speed not exceeding 6,000 rpm, preferably less than 6,000 rpm, and a mixing chamber pressure not exceeding 2.5 bar, preferably less than 2.5 bar.

The components according to the following specification (Table 1) were used as basic materials for the foaming, the prepolymers used in accordance with the invention having been produced according to Example 1 and the polyether polyol of the reference example being identical to that in Example 1 and having a viscosity of approx. 700 mPa·s:

TABLE 1

| Formulation with PREPOLYMER according to the present invention | | Formulation with POLYETHER POLYOL (reference example; prior art) | |
|---|---|---|---|
| 100 php* | prepolymer with hydroxyl number 30 | 100 php | polyether polyol with hydroxyl number 56 |
| 17.8 php | TDI 80/20 (diisocyanato-toluene, mixture of 2,4- and 2,6-isomers in a ratio of 80/20) | 47.8 | TDI 80/20 (diisocyanato-toluene, mixture of 2,4- and 2,6-isomers in a ratio of 80:20) |
| 17.8 php | TDI 65/35 (diisocyanato-toluene, mixture of 2,4- and 2,6-isomers in a ration of 65:35) | 3.8 php | water |
| | | 0.05 php | DABCO 33 LV |
| | | 0.12 php | Niax A - 1 |
| | | 0.20 php | stannous dioctoate 33% |
| 3.0 php | Water | 1.05 php | stabilizer |
| 0.05 php | DABCO 33 LV | | |
| 0.12 php | Niax A - 1 | | |
| 0.18 php | stannous dioctoate 33% | | |
| 1.05 php | Stabilizer | | |
| 10 standard litres/min | Nitrogen | | |

*php = parts per hundred of polyol (or prepolymer or prepolymer/polyol mixture) by weight The flexible PU foams produced under these conditions were subjected to the following tests:

a) reduction in the compression hardness due to accelerated ageing test, and b) determination of the cell structure (ppi).

The compression hardness was measured in kPa·s before and after the accelerated ageing test. This is determined according to EN ISO 3386-1 at 40% deformation. The accelerated ageing test (wet ageing) was performed according to EN ISO 2440 in the autoclave for 5 h with saturated steam at 120° C. (one ageing cycle).

The cell structure was determined by counting the number of cells situated on a straight line. The data is given in ppi (pores per linear inches or 2.54 cm).

TABLE 2

| | Test results | | | |
|---|---|---|---|---|
| | Compression hardness before accelerated ageing test [kPa] | Compression hardness after accelerated ageing test [kPa] | Reduction in compression hardness [%] | Cell count (ppi) |
| PREPOLYMER foamed | 3.37 | 3.37 | 0% | 92 |
| POLYETHER POLYOL foamed (reference example) | 3.67 | 3.41 | 7.08% | 45 |

As can be seen from this comparison (Table 2), the flexible PU foam produced according to the invention and having a density of approx. 25 kg/m3 is not only substantially more fine-celled but also at the same time much more resistant to ageing than the foam produced according to a typical method in the prior art which is formulated to have a similar density.

It moreover emerged that all the various foam products so far produced by the method according to the invention have a significantly better resistance to wet ageing (according to the criteria of the aforementioned accelerated ageing test) than those foams with an identical or largely identical formulation produced under comparable conditions by known methods in the prior art.

Whilst the reduction in the compression hardness in the case of foams produced according to known methods was up to 35%, this value did not exceed 15% in the case of foams produced according to the invention for an identical or largely identical formulation in respect of the main isocyanate and polyol components. In the case of foams having a cell count of >80 ppi and a density of 20-30 kg/m3 the reduction in the compression hardness even lay in a range of just 0 to 5%.

As a rule, the reduction in the compression hardness of products produced according to the invention was at any rate 10 to 50% lower than in the case of comparable products of the prior art. This impressively demonstrates the substantially improved resistance to ageing, in particular the resistance to wet ageing, of the foams produced according to the invention.

In this context a formulation for a reference product is selected to give essentially identical density and hardness characteristics of a product according to the invention.

More specifically, a formulation for the reference product is selected to give foam of approximately the same apparent density and hardness, within a tolerance range of ±10%, as the foam produced according to invention.

EXAMPLE 3

Production of a Coarse-Cell Flexible Foam Through Reduction of the Bubble Nucleation In a further reaction formulation according to Example 2, a flexible foam having a density of 18 kg/m3 and a cell count of 8 ppi was produced from the same formula with the prepolymer by degassing of the basic material, primarily the isocyanate used.

These and further examples are given with reference to the following Table 3 in which columns A & B are as in Table 1, column C is Example 3 above and the other columns are other examples using formulations and procedures identical with Table 1 except where indicated and except that in each case processing is done as laboratory mixes rather than the machine mixing of Table 1.

TABLE 3A

Examples (mixes based on 200 grams of Polyol), all amounts php (parts per hundred of polyol and/or prepolymer)

| | A | B | C | D | E | F | G | H | I | J |
|---|---|---|---|---|---|---|---|---|---|---|
| Polyol OH = 56 | 100 | | | 100 | | | | 100 | | |
| Prepolymer | | 100 | 100 | | 100 | 100 | 100 | | 100 | 100 |
| TDI 80/20 | 47.8 | 17.8 | | 24.2 | 23.2 | 23.2 | 22.6 | 48 | 47.7 | 46.9 |
| TDI 65/35 | | 17.8 | 45.2 | 24.2 | 23.2 | 23.2 | 22.6 | | | |
| Water | 3.8 | 3 | 4.2 | 3.8 | 3.8 | 3.8 | 3.8 | 3.8 | 3.8 | 3.8 |
| Dabco 33lv | 0.05 | | 0.05 | | | | | 0.05 | 0.05 | 0.05 |
| Niax A1 | 0.12 | | 0.12 | | | | | 0.12 | 0.12 | 0.12 |
| Stannous Octaote 33% | 0.18 | 0.2 | 0.2 | | | | | 0.3 | 0.3 | 0.3 |
| Tegoamin ZE-1 | | | | 0.3 | 0.3 | 0.3 | 0.3 | | | |
| Kosmos EF | | | | 1.5 | 1.5 | 1.5 | 1.5 | | | |
| Silicone Sufactant | 1.05 | 1.05 | 1.05 | 1.5 | 1.5 | 1.5 | 1.5 | 1.05 | 1.05 | 1.05 |
| Amount of Isocyanate in Prepolymer php | nil | 3.89 | 3.89 | nil | 0.5 | 1 | 2 | nil | 1 | 2 |
| Viscosity of Polymer or Prepolymer mPa | 700 | 30,000 | 30,000 | 700 | 800 | 1,440 | 2,000 | 700 | 1,450 | 2,010 |
| Density Kg/M3 | 24.8 | 25 | 18 | 22.7 | 22.6 | 22.5 | 23 | 23.6 | 23.9 | 26 |
| CLD 40% (Kpa) | 3.67 | 3.37 | 3.9 | 3.31 | 2.46 | 3.03 | 2.98 | 3 | 3.44 | 3.91 |
| Reduction in CLD after Humid Ageing (%) | 7.08 | 0 | 2.5 | 19.3 | 12.1 | 6.6 | 14.4 | 21 | 9.3 | 9.8 |
| Cell size (ppi) | 45 | 92 | 8 | 54 | 48 | 50 | 55 | 55 | 52 | 56 |

TABLE 3B

Examples (mixes based on 200 grams of Polyol), all amounts php (as above)

| | K | L | M | N | O | P | Q | R |
|---|---|---|---|---|---|---|---|---|
| Polyol OH = 56 | 100 | | | | | | | 50 |
| Prepolymer | | 100 | 100 | 100 | 100 | 100 | 100 | 50 |
| TDI 80/20 | 20.2 | 18.3 | 18.2 | 18.2 | 18.2 | 19.8 | 20 | 20 |
| TDI 65/35 | 20.2 | 18.2 | 18.2 | 18.2 | 18.2 | 19.8 | 20 | 20 |
| Water | 3.1 | 3.1 | 3.1 | 3.1 | 3.1 | 3.1 | 3.1 | 3.1 |
| Dabco 33lv | | | | | | | | |
| Niax A1 | | | | | | | | |
| Stannous Octaote 33% | | | | | | | | |
| Tegoamin ZE-1 | 0.3 | 0.3 | 0.3 | 0.3 | 0.3 | 0.3 | 0.3 | 0.3 |
| Kosmos EF | 1.5 | 0.8 | 1.5 | 1.5 | 1.5 | 1.5 | 1.5 | 1.5 |
| Silicone Sufactant | 1.5 | 1 | 1.5 | 1.5 | 1.5 | 1.5 | 1.5 | 1.5 |
| Amount of Isocyanate in Prepolymer php | nil | 3.5 | 2 | 1 | 3.9 | 0.8 | 0.27 | 1 |
| Viscosity of Polymer or Prepolymer mPa | 700 | 17,000 | 2,000 | 1,440 | 8,850 | 750 | 700 | 1,440 |
| Density Kg/M3 | 28.6 | 30.9 | 28.3 | 29.3 | 27.1 | 29.2 | 28 | 27.5 |
| CLD 40% (Kpa) | 2.76 | 4.4 | 2.68 | 2.37 | 4.65 | 3.34 | 3.1 | 2.8 |
| Reduction in CLD after Humid Ageing (%) | 24.5 | 12.6 | 9 | 0.8 | 11.6 | 11.1 | 11 | 10.4 |
| Cell size (ppi) | 52 | 49 | 51 | 48 | 53 | 50 | 49 | 47 |

TABLE 3C

| Examples (mixes based on 200 grams of Polyol), all amounts php (as above) | | |
|---|---|---|
| | S | T |
| Polyol OH = 48 (EO/PO) | 100 | |
| Prepolymer | | 100 |
| TDI 80/20 | 15.2 | 14.5 |
| TDI 65/35 | 15.2 | 14.5 |
| Water | 2.3 | 2.3 |
| Tegoamin ZE-1 | 0.3 | 0.3 |
| Kosmos EF | 1.5 | 1.5 |
| Silicone | 1 | 1 |
| Amount of Isocyanate in Prepolymer php | | 2 |
| Viscosity of Polymer or Prepolymer mPa | 600 | 3,700 |
| Density Kg/M3 | 34.8 | 37.6 |
| CLD 40% (Kpa) | 2.31 | 4.13 |
| Reduction in CLD after Humid Ageing (%) | 19.5 | 11.1 |
| Cell size (ppi) | 46 | 46 |

Tegoamin ZE-1 and KOSMOS EF are respectively amine and tin catalysts which perform differently from Dabco 33LV and Niax A1 but have desirable low fogging properties.

Explanation of Table 3

Columns A & B are Example 1 described above and column C is Example 3. That is, columns B and C are foams made in accordance with the invention (with high viscosity prepolymer) using machine production, and column A is a conventional reference machine made foam made with the same base polyol as that used to make the prepolymer of column B, formulated to have the same density as the foam of column B.

A substantial improvement in hydrolysis ageing is shown, with controlled fine and course cell structures (columns B & C).

Columns D to G are foams made with similar densities and similar water levels in the foaming stage. The same isocyanate and catalyst (TDI and DBTL) are used in making the prepolymer but at different isocyanate proportions to give different prepolymer viscosities. The base polyol is the same as that used in Example 1 (MW=3,000). The foam catalysts differ from those of Example 1: they are low fogging catalysts preferred for manufacture of foams used in the automotive industry.

The foam according to the invention (columns E-G) have improved ageing properties compared with their reference column D.

Column H-J are similar to column A (and use the same polyol, and the same isocyanate and catalyst to make the prepolymer) but have different proportions of isocyanate used in making the prepolymer and are laboratory mixes, not machine mixes. The foams according to the invention (columns I, J) have improved ageing properties compared with reference column H.

Columns K-R are further examples (which use the same polyol as Example 1) with different proportions of isocyanate used to make the prepolymer, at a lower foaming water level to Example 1, and which vary the following parameters as follows:

i) isocyanate/catalyst used to make the prepolymer:
   K—N, Q, R: TDI+DBTL
   O: TDI+Stannous Octoate
   P: polymeric MDI (e.g. Voranate M220 from Dow Chemical)+DBTL ii) K is the reference example with base polyol not converted to prepolymer; L-Q have the same amount of the same base polyol converted to prepolymer; P has half the amount of the same base polyol converted to prepolymer diluted with an equal amount of the same base polyol not converted to prepolymer.

The foam according to the invention (columns L-R) have improved ageing properties compared with reference column K.

Columns S & T differ from Example 1 particularly with regard to the polyol which is an EO/PO polyol (rather than the exclusively PO polyol of Example 1) and may be a trifunctional polyether polyol with a majority of secondary OH groups MW=3,500, particularly LUPRANOL® 2084 (BASF). The isocyanate/catalyst used in making the prepolymer is TDI/DBTL.

The foam according to the invention (column T) shows improved ageing properties compared with the reference (column S).

It can be seen that with the formulations of Table 3, as is the case with Tables 1, 2 (which are repeated in columns A and B of Table 3), hardness loss is much improved with the formulations according to the invention compared with the reference formulations which do not use prepolymer in accordance with the invention.

Different proportions of isocyanate used in making the prepolymer give different prepolymer viscosities ranging from a relative low viscosity level of 700 mPa·s to a high viscosity level (30,000 mPa·s). In each case however there is demonstrated a surprisingly substantial improvement in hardness loss compared with the corresponding reference formulation showing that the important factor is the use of the OH terminated isocyanate/polyol prepolymer. The results show that additionally, in some cases, increased viscosity may also be a contributory factor. Good quality useable foams can be obtained at a wide range of prepolymer viscosities.

As mentioned above higher levels of isocyanate giving higher prepolymer viscosities can give a slightly higher density to the final foam.

The use of the foams according to the invention, in particular the foam slab stock produced on an industrial scale, is exceptionally varied. It extends from uses in electrical, sound and heat-insulation systems, for example in building and civil engineering and in motor vehicle manufacture, through the manufacture of cleaning aids in the form of cleaning sponges or cleaning appliances equipped therewith, via the manufacture of cosmetics sponges and comfort foams, such as mattress and upholstery foams, to special uses as carrier foams for inks in recording devices or printers, or as stamp pads.

It is of course to be understood that the invention is not intended to be restricted to the details of the above example formulations, which are described by way of example only.

In addition to providing a method of making polyurethane foam the invention provides new storage stable prepolymers for use in making such foams, as hereinbefore described.

The invention claimed is:

1. A method of making a flexible polyurethane foam by foaming a mixture of prepolymer and foam-forming ingredients to form a foaming mixture, wherein the prepolymer is made by reacting at least one trifunctional polyether polyol having 100% secondary OH groups with at least one aromatic multifunctional isocyanate comprising TDI and/or polymeric MDI, the prepolymer is a non-foamed polyol prepolymer having a viscosity below 20,000 mPa·s, said viscosity value being obtained at a temperature of 25 degrees C., and having available OH groups made by reacting a proportion in the range 0.1% to 30% by weight of the theoretical amount of the aromatic multifunctional isocyanate required to react with all available hydroxyl groups of the polyol, and the foam-forming ingredients comprise at least a multifunctional isocyanate and water, wherein said polyol is not a polyester polyol, and there is no polyester polyol in the foaming mixture.

2. The method according to claim 1, wherein the polyol is at least predominantly a propylene oxide (PO) derived polyether polyol.

3. A method of making a flexible polyurethane foam by foaming a mixture of prepolymer and foam-forming ingredients to form a foaming mixture, wherein the prepolymer is made by reacting at least one trifunctional polyether polyol having 100% secondary OH groups with at least one aromatic multifunctional isocyanate comprising TDI and/or polymeric MDI, the prepolymer is a non-foamed polyol prepolymer having a viscosity in the range 5,000-50,000 mPa·s, said viscosity value being obtained at a temperature of 25 degrees C., and having available OH groups made by reacting a proportion in the range 30% to 99% by weight of the theoretical amount of the aromatic multifunctional isocyanate required to react with all available hydroxyl groups of the polyol, and the foam-forming ingredients comprise at least a multifunctional isocyanate and water, wherein said polyol is not a polyester polyol, and there is no polyester polyol in the foaming mixture.

4. The method according to claim 3, wherein the polyol is at least predominantly a propylene oxide (PO) derived polyether polyol.

* * * * *